United States Patent [19]

Wakugawa et al.

[11] Patent Number: 4,856,887

[45] Date of Patent: Aug. 15, 1989

[54] LIGHTWEIGHT SILICON CARBIDE MIRROR

[75] Inventors: Jason M. Wakugawa, El Segundo; Lawrence S. Gresko, Long Beach; Kenneth M. Brown, Los Angeles, all of Calif.

[73] Assignee: Hughes Aircraft Company, Los Angeles, Calif.

[21] Appl. No.: 33,480

[22] Filed: Apr. 1, 1987

[51] Int. Cl.[4] ............................. G02B 5/08; G02B 7/18
[52] U.S. Cl. ..................................... 350/641; 350/609; 428/448
[58] Field of Search ............... 350/609, 607, 610, 641, 350/600, 320; 428/448, 446, 447, 428, 429

[56] References Cited

U.S. PATENT DOCUMENTS

| | | | |
|---|---|---|---|
| 4,035,065 | 7/1977 | Fletcher et al. | 350/609 |
| 4,142,006 | 2/1979 | Choyke et al. | 350/320 |
| 4,214,818 | 7/1980 | Choyke et al. | 350/610 |
| 4,388,344 | 6/1983 | Shuskus et al. | 350/641 |
| 4,397,901 | 8/1983 | Warren | 428/375 |
| 4,444,467 | 4/1984 | Shuskus et al. | 350/607 |
| 4,501,777 | 2/1985 | Rose | 427/255 |
| 4,657,359 | 4/1987 | Thompson et al. | 350/610 |

OTHER PUBLICATIONS

W. J. Choyke et al, "SiC: A New Material for Mirrors ...", *Applied Optics,* vol. 15, No. 9, pp. 2006–2007, Sep. 1976.

*Primary Examiner*—Jon W. Henry
*Attorney, Agent, or Firm*—W. J. Streeter; A. W. Karambelas

[57] ABSTRACT

A lightweight mirror comprises a silicon carbide (SiC) foam core having a bulk density of approximately five percent. The mirror further comprises two solid facesheets each of which is integrally formed upon a surface of the SiC foam core, the facesheets being comprised of SiC. Upon a machined surface of one or both of the facesheets a further layer of SiC is deposited to reinforce the SiC facesheet and to provide an optically polishable surface. This outer layer of SiC may be deposited by chemical vapor deposition (CVD) techniques. After depositing this reinforcing layer of SiC, the layer is machined and polished to provide a mirror surface having a desired flatness and optical quality.

7 Claims, 1 Drawing Sheet

LIGHTWEIGHT SILICON CARBIDE MIRROR

FIELD OF THE INVENTION

The present invention relates to mirrors and, in particular, relates to a lightweight mirror having a core or substrate comprised of silicon carbide reticulated foam encased by facesheets of fully dense silicon carbide.

BACKGROUND OF THE INVENTION

Lightweight mirrors have great utility in optical systems that require mirrors which are resistant to distortion caused by gravitational sag effects. Lightweight mirrors are also advantages in airborne and space-based optical systems wherein a reduction in overall weight of the optical system in desired. Lightweight mirrors are also advantageous in cryogenic optical systems wherein a reduction in the thermal mass of the mirror facilitates the cooling of the mirror and the maintenance of the mirror at a desired low temperature.

It has been known in the art to fabricate lightweight mirrors over a core or substrate which is comprised of webs made from a variety of materials, such as fused silica, beryllium (Be) and cast silicon carbide (SiC).

The core typically separates two relatively thin facesheets, at least one of the facesheets being polished to provide the mirror face. One such lightweight mirror of the prior art is described in a journal article entitled "Fabricated Lightweight Metal Optic Substrates", S.P.I.E., vol. 131, page 85 (1978), by L. A. Grant.

Such mirrors of the prior art typically comprise a system of webs which serve as the mirror substrate. The webs are often arranged as square cell cores upon which the facesheet material is bonded. Due to the nature of the square cell core substrate, the facesheets must have a thickness which is sufficient to maintain the facesheet dimensional stability over those regions of the core defined by the large voids within the square cells. This requisite minimum thicknss of the facesheet tends to make the facesheets relatively thick, thereby adding to the weight and thermal mass of the mirror.

SUMMARY OF THE INVENTION

The foregoing problems of the prior art are overcome and other advantages are realized by a lightweight mirror having a core or substrate which is comprised of a solid foam material. The foam-like core has a low solid material to void ratio and is thus lightweight. Such a core may physically resemble a sponge.

In an illustrative embodiment of the invention, a lightweight circular mirror comprises a solid SiC foam core having a bulk density of approximately five percent. The mirror further comprises two solid facesheets each of which is integrally formed upon a surface of the SiC foam core, the facesheets being comprised of SiC. Upon a machined surface of one or both of the facesheets a further layer of SiC is deposited to reinforce the SiC facesheet and to provide an optically polishable surface. This outer layer of SiC may be deposited by chemical vapor deposition (CVD) techniques. After depositing this reinforcing layer of SiC, the layer is machined and polished to provide a mirror surface having a desired flatness and optical quality.

Due to the relatively small voids within the SiC foam core, as compared to the square cell core construction of the prior art, the facesheets may be made thinner than in mirrors of the prior art since the relatively small voids within the core material provide for supporting the facesheets in a more continuous fashion. Due to the low bulk density of the SiC core and the relative thinness of the facesheets, a lightweight mirror having superior optical qualities to those mirrors of the prior art is realized. These qualities include an overall reduction in mirror weight which further results in a resistance to gravitational sag, greater dimensional stability and a relatively low thermal mass which facilitates cooling of the mirror.

BRIEF DESCRIPTION OF THE DRAWINGS

These and other aspects of the present invention will be more fulliy described in the detailed description of a preferred embodiment taken in conjunction with the drawing, wherein.

DETAILED DESCRIPTION OF A PREFERRED EMBODIMENT

Figure 1:
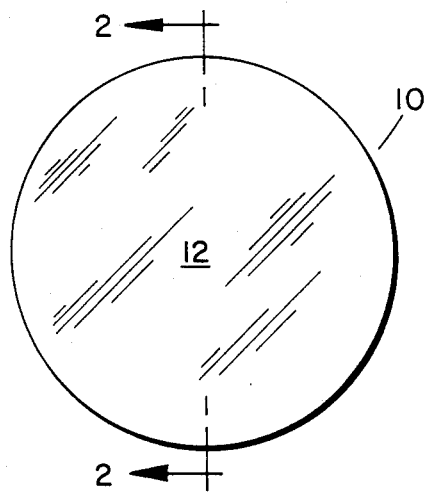
FIG. 1 shows a frontal view of a circular mirror constructed in accordance with the invention.
Figure 2:
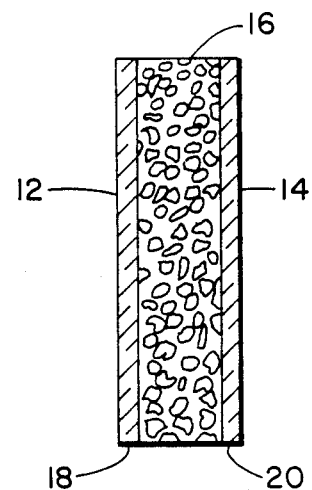
FIG. 2 shows a side cut away view of the mirror of FIG. 1 taken along the line 2—2.

Referring now to FIGS. 1 and 2 there are shown two views of a mirror 10 constructed in accordance with the invention. As can be seen, mirror 10 has an essentially circular shape, the circular shape defining a reflective surface 12. It should be realized that, although the present invention will be described in the context of such a circular mirror, that a mirror having any desired shape may be constructed in accordance with the invention. It should further be realized that the use of the invention is well suited for the fabrication of off-axis aspheric mirrors and also for a variety of other types of mirror geometries, such as corner reflector mirros.

Mirror 10 may comprise first and second surfaces, shown as a reflecting surface 12 and a back surface 14. Of course both surfaces 12 and 14 may be reflective if so desired. Surfaces 12 and 14 are separated by a core 16 which, in accordance with the teaching of the invention, comprises a solid foam-like material having a low solid to void ratio and, hence, a low bulk density. In a preferred embodiment of the invention, the foam material comprises SiC and the surfaces 12 and 14 are formed upon thin facesheet layers 18 and 20, respectively. Layers 18 and 20 are also, in a preferred embodiment of the invention, comprised of SiC.

One method of fabricating a mirror such as the mirror 10 will now be described. Initially, a disk of foam material which has constituent carbon molecules, such as polyurethane foam, is cut to a desired mirror substrate shape and thickness. The foam material is subsequently processed to remove from the material all constituent molecules except for the carbon molecules such that a carbon foam is produced. Throughout this carbon foam substrate is next deposited a layer of SiC such as by a well known chemical vapor deposition technique. After the deposition of the SiC upon the carbon foam the carbon is removed by, typically, a pyrolytic process such that a monolithic SiC foam remains. At least one surface of the SiC foam is densified by a thin layer of SiC ceramic cement which is applied to the surface. However, it may be desireable to densify opposing surfaces of the substrate in order to provide structural support to the substrate. The layer of cement may be applied by brushing, spraying, or by any suitable technique. The ceramic cement integrally combines with the exposed surfaces of the SiC foam core as the cement cures and is transformed into a layer of essentially pure SiC. The cured ceramic cement "flats" are then machines to provide surfaces which have a desired flatness or a desired curvature and which are suitable for the deposition of a thin layer of SiC thereon. The thin layer of SiC may be deposited by chemical vapor deposition techniques in order that the thickness and uniformity of the layer may be controlled. This thin layer of SiC reinforces the underlying SiC facesheets and also provides an optically polishable surface. One or both of the thin layers of SiC are then machined and polished to provide a mirror surface having a desired optical quality.

Of course, it should be realized that the lightweight mirror of the invention may be fabricated by any number of suitable techniques, so long as the resultant mirror is comprised of a solid foam-like substrate having at least one densified surface suitable for being polished to form a reflective surface thereon.

A mirror fabricated in accordance with the instant invention overcomes the aforementioned problems of the prior art in that the mirror is lightweight while yet providing for continuous facesheet support. Such a mirror is characterized by having excellent dimensional stability. The mirror also has a low weight and a low thermal mass which facilitates the cooling of the mirror in cryogenic applications. The mirror furthermore has mechanical, thermal and outgassing characteristics which are superior to the mirrors of the prior and which make the mirror well suited for use within a spacecraft. Furthermore, the mirror is readily scalable to a desired dimension and, when combined with known heat pipe technologies, is well suited for the fabrication of high energy optic systems which typically require faceplate cooling in order to minimize optical distortion due to thermal effects induced by an incident, high energy radiation beam.

Figure 3:
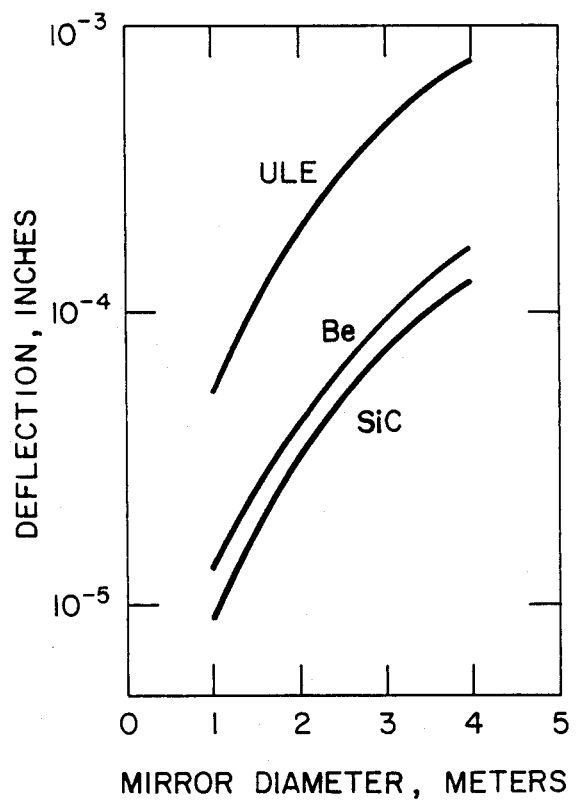
FIG. 3 is a graph which shows the static sag of a mirror, constructed in accordance with the invention, and the static sag of some types of prior art mirrors.

The resistance of the mirror 10 to deflection caused by static gravitational sag is also superior to mirrors fabricated in accordance with the techniques of the prior art. Referring to FIG. 3 there is shown a graph which shows the deflection in inches as a function of the mirror diameter in meters. As can be seen, the foam core SiC mirror of the present invention is contrasted to two mirrors of the prior art, specifically an ultra-low expansion (ULE) mirror (ULE is a trademark of the Corning Glass Company) and a beryllium mirror. The ULE and beryllium mirrors each have a square cell core construction characterized by approximately a ten percent bulk density. The SiC mirror of the present invention, having a SiC foam core having an approximately five percent bulk density, can be seen to exhibit a lower deflection than these other mirrors. The three types of mirrors depicted each have a ten to one aspect ratio and a laminated construction with a facesheet thickness which is approximately 2.5percent of the overall mirror thickness. The relative mirror weights based upon the beryllium mirror having a weight of one are as follows: the SiC mirror relative weight is approximately 1.15 and the ULE mirror relative weight is approximately 1.19. The mirrors are all supported along edges thereof and have the mirror surface disposed orthoganally to the gravitational force.

While the invention has been disclosed in the context of a preferred embodiment thereof, it should be realized that the invention may be practiced in any number of embodiments and should not be limtied to the preferred embodiment disclosed herein. For example, although the mirror disclosed herein is shown to have one or two reflecting surfaces, it should be realized that a mirror having more than one or two reflecting surfaces, such as a corner cube relfector, may advantageously make use of the invention. Also, material other than SiC may be employed to form the solid foam core and the facesheets. Also, other methods may be employed to provide the foam core and the densification of at least one surface thereof may be employed within the scope of the invention. The invention is thus intended to be limited only by the appended claims.

What is claimed is:

1. A mirror comprising:
   a substrate which comprises foam-like silicon carbide material having a solid to void ratio such that the substrate has a bulk density which is substantially less than a maximum possible bulk density; and
   at least one facesheet integrally formed upon a surface of said substrate, said facesheet being comprised of a layer of fully dense silicon carbide, said facesheet having a polished surface for providing said facesheet with reflective properties.

2. A mrror as defined in claim 1 wherein said polished surface is comprised of a thin layer of silicon carbide which is deposited upon said fully dense layer of silicon carbide.

3. A mirror as defined in claim 1 wherein said facesheet is comprised of a cured layer of silicon carbide cement integrally joined to the surface of said substrate.

4. A mirror as defined in claim 3 wherein said substrate has a bulk density of approximately five percent.

5. A mirror as defined in claim 3 wherein the thickness of said facesheet is approximately 2.5 percent of the overall thickness of the mirror.

6. A mirror having one or more reflective surfaces comprising:
   a foam-like solid substrate comprised of silicon carbide having a solid to void ratio such that the substrate has a bulk density which is substantially less than a maximum possible bulk density; and
   at least one solid facesheet comprised of a cured layer of silicon carbide cement integrally joined to a surface of said substrate, said cured layer having a polished layer of silicon carbide depositd thereon, the polished layer being operable for reflecting incident radition therefrom.

7. A mirror as defined in claim 6 and further comprising a second facesheet comprised of a cured layer of silicon carbide cement joined to an opposing surface of said substrate.

* * * * *